(12) United States Patent
Sternberg

(10) Patent No.: US 7,890,413 B2
(45) Date of Patent: Feb. 15, 2011

(54) TRANSACTION STRUCTURES, SYSTEMS, AND METHODS FOR ISSUING A DEBT INSTRUMENT BACKED BY A MARKET VALUE OF AN ASSET

(75) Inventor: Michael I. Sternberg, NY, NY (US)

(73) Assignee: Morgan Stanley, New York, NY (US)

( * ) Notice: Subject to any disclaimer, the term of this patent is extended or adjusted under 35 U.S.C. 154(b) by 79 days.

(21) Appl. No.: 11/401,631

(22) Filed: Apr. 11, 2006

(65) Prior Publication Data

US 2006/0229973 A1    Oct. 12, 2006

Related U.S. Application Data

(60) Provisional application No. 60/670,404, filed on Apr. 12, 2005.

(51) Int. Cl.
    *G06Q 40/00*    (2006.01)
(52) U.S. Cl. .......................... 705/37; 705/36 R; 705/35
(58) Field of Classification Search .................... 705/35
    See application file for complete search history.

(56) References Cited

U.S. PATENT DOCUMENTS

| | | | |
|---|---|---|---|
| 2003/0018563 A1* | 1/2003 | Kilgour et al. | 705/37 |
| 2003/0172019 A1* | 9/2003 | Getty | 705/36 |
| 2004/0205021 A1* | 10/2004 | Cahill et al. | 705/38 |
| 2004/0249736 A1* | 12/2004 | Curry et al. | 705/35 |
| 2005/0102224 A1* | 5/2005 | Blanz et al. | 705/38 |
| 2005/0197857 A1* | 9/2005 | Avery | 705/1 |

OTHER PUBLICATIONS

NPL Ref-1: Municipal Mortgage & equity, Fair Disclosure wire P:n/a May 8, 2009 JRNL CODE: FDCW.*
NLP Ref-2:Toxic pipes Lerner, Leib M, Business Lawyer v58n2 pp. 65-688 Feb. 2003 ISSN: 0007-6899 NRNL CODE: BLW.*
NPL Ref-3: A Trust Judiciary's Duty, Borkus, Randall H, Real Property, Prbate & Trust Journa v36 I pp. 127-166 Spring 2001, ISSN:0034-0855 JRNL CODE: ARPP.*

* cited by examiner

*Primary Examiner*—Hani Kazimi
*Assistant Examiner*—Hatem Ali

(57) ABSTRACT

A transaction structure for issuing a debt instrument. The transaction structure includes a first entity and a second entity. The first entity transfers an asset in exchange for receiving a beneficial interest in the asset, then issues the debt instrument. The debt instrument is backed by a market value of the asset. The second entity issues the beneficial interest in the asset in exchange for receiving the asset. The market value of the asset is determined by a clearing price of a Dutch auction.

4 Claims, 3 Drawing Sheets

TRANSACTION STRUCTURES, SYSTEMS, AND METHODS FOR ISSUING A DEBT INSTRUMENT BACKED BY A MARKET VALUE OF AN ASSET

CROSS-REFERENCE TO RELATED APPLICATION

This application claims the priority benefit of U.S. Provisional Application No. 60/670,404, filed on Apr. 12, 2005.

BACKGROUND

This application discloses an invention that is related, generally and in various embodiments, to transaction structures, systems, and methods for issuing one or more debt instruments backed by the market value of one or more assets.

In a common securitization scheme, an entity issues debt securities backed by the cash flow and other economic benefits generated by a pool of assets (usually loans or other debt instruments). In some other types of securitizations, the debt is backed by the market value of the assets, as opposed to the cash flows. In market-value-backed debt, such as traditional mortgage value debt or market-value CDOs (collateralized debt obligations), a dealer is often able to supply a quote or bid for the market value of the assets because the relevant market is sufficiently liquid. The market value quotes are then used to rate the issued debt. Similarly, for EETCs (enhanced equipment trust certificates), there is an appraisal of the underlying assets, typically aircraft, for which there is often a somewhat liquid market. Where, however, the assets are relatively illiquid, a dealer quote on the market value of the assets and/or an appraisal of the assets is often inadequate for debt sizing purposes by the rating agencies and, by extension, inadequate for the potential investors in the debt.

SUMMARY

In one general respect, this application discloses a transaction structure. According to various embodiments, the transaction structure includes a first entity and a second entity. The first entity transfers an asset in exchange for receiving a beneficial interest in the asset, then issues a debt instrument backed by a market value of the asset. The second entity issues the beneficial interest in the asset in exchange for receiving the asset. The market value of the asset is determined by a clearing price of a Dutch auction.

In another general respect, this application discloses a method. According to various embodiments, the method comprises transferring an asset in exchange for receiving a beneficial interest in the asset, determining a market value of the asset based on a clearing price of a Dutch auction, and issuing a debt instrument backed by the market value of the asset.

In another general respect, this application discloses a system. According to various embodiments, the system comprises an auction module for determining a clearing price of a Dutch auction, and a debt service coverage module in communication with the auction module. The debt service coverage module is for determining a market value of an asset based on the clearing price.

Aspects of the disclosed invention may be implemented by a computer system and/or by a computer program stored on a computer readable medium. The computer readable medium may comprise a disk, a device, and/or a propagated signal.

Other features and advantages will be apparent from the following description, including the drawings, and from the claims.

DRAWINGS

Various embodiments of the present invention are described herein by way of example in conjunction with the following figures, wherein.

DETAILED DESCRIPTION

It is to be understood that at least some of the figures and descriptions of the disclosed invention have been simplified to illustrate elements that are relevant for a clear understanding of the disclosed invention, while eliminating, for purposes of clarity, other elements. Those of ordinary skill in the art will recognize, however, that these and other elements may be desirable. However, because such elements are well known in the art, and because they do not facilitate a better understanding of the disclosed invention, a discussion of such elements is not provided herein.

Figure 1:
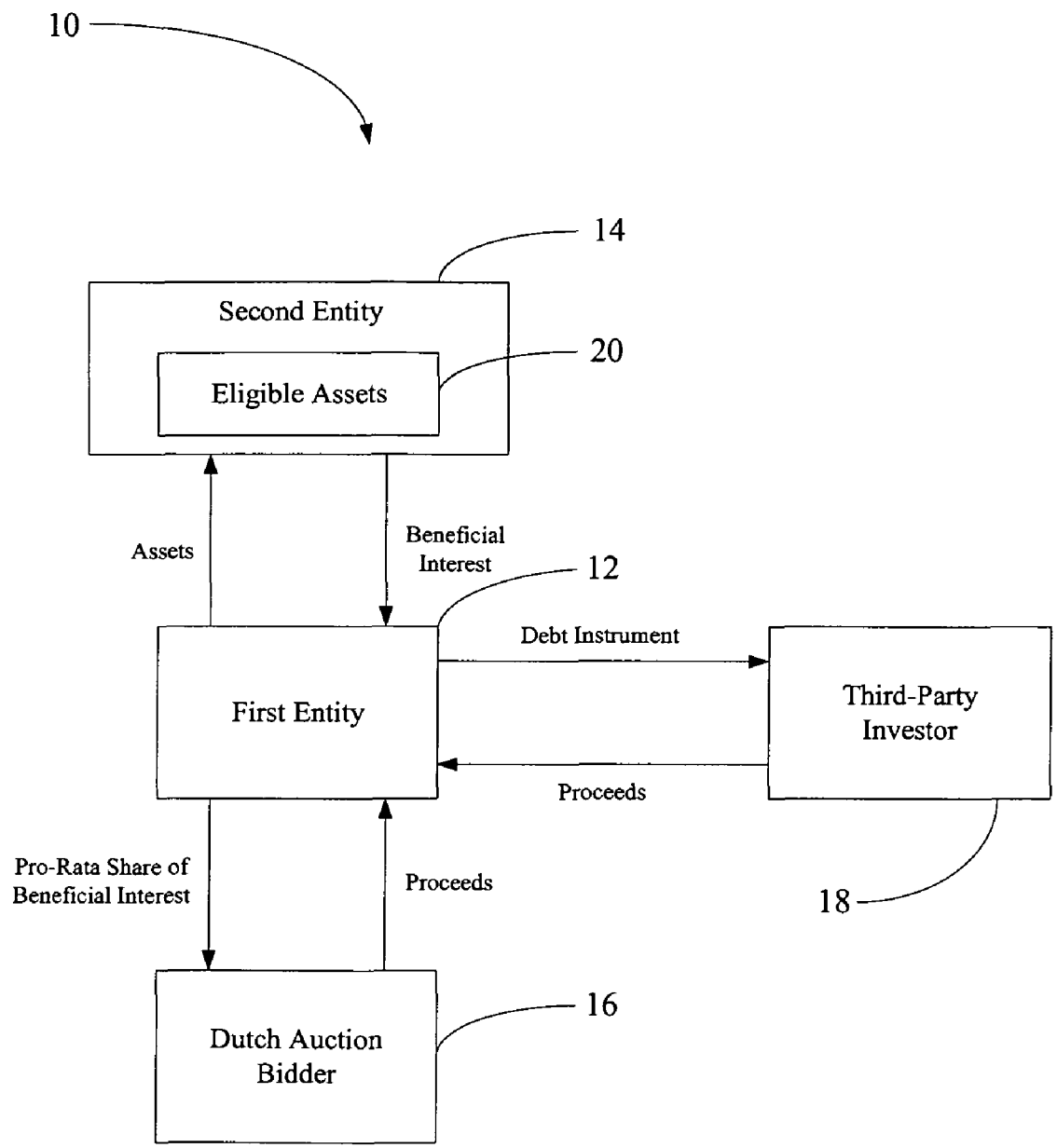
FIG. 1 illustrates various embodiments of a transaction structure.

FIG. 1 illustrates various embodiments of a transaction structure 10. The transaction structure 10 shows the relationships between various entities involved in a transaction that comprises the issuance of one or more debt instruments backed by the market value of one or more assets. The various entities comprise a first entity 12, a second entity 14, a bidder 16, and a third-party investor 18.

In general, the first entity 12 may initially own one or more specified assets that generate revenue. The first entity 12 may be organized in any suitable manner. The first entity 12 may wish to monetize the cash flows from the specified assets through the issuance of one or more debt instruments (e.g., notes or bonds) that are backed by the market value of the assets (as opposed to the cash flows from the assets). The transaction structure 10 may be utilized when the specified assets are relatively illiquid. For example, the transaction structure 10 may be utilized when the assets are equipment leases, loans on transportation vehicles (e.g., aircraft, trucks, etc.), consumer finance products that lack sufficient tracking regimens, and other assets for which it is difficult and/or non-transparent to determine the market value of the assets. The debt instruments may be purchased by one or more third-party investors 18 at a price influenced by the market value of the assets that back the debt instruments. The debt instruments can have a coupon rate that is either fixed or floating. The interest frequency can be, for example, quarterly, semi-annually, etc. The maturity of the debt instruments can be, for example, a number of years. In addition, the debt instruments may be callable.

As shown in FIG. 1, the first entity 12 may transfer the specified assets to the second entity 14 in exchange for receiving a beneficial interest in the assets from the second entity 14. According to various embodiments, the second entity 14 may be organized as a special purpose vehicle (SPV) or a trust. The beneficial interest may comprise, for example, an ownership interest in (i) the specified assets, (ii) the cash flow generated by the specified assets, (iii) new assets purchased with the cash flows generated by the specified assets, and (iv) cash flows generated by the new assets (collectively referred to herein as "the eligible assets 20"). The eligible assets 20 may comprise relatively illiquid assets for which, traditionally, there has not been a significant market from which to adequately determine the market value of the assets.

According to various embodiments, the beneficial interest may be issued in the form of one or more instruments (e.g., equity certificates), and each instrument may evidence a pro rata ownership interest in the eligible assets 20. The instruments evidencing the pro rata ownership interest may (although not necessarily) have a maturity that matches the term of the debt instruments subsequently issued by the first entity 12. The new assets may be originated, for example, within set guidelines from principal generated by the specified assets during a managed revolving time period (e.g., two years) during the term of the certificates. The cash flows generated by the specified assets and the new assets may comprise cash flows generated prior to release on the distribution date of the equity certificates. Earnings from the cash flows may be paid out periodically to the third-party investors 18 (i.e., the holders of the debt instruments). The periodicity of the pay outs may match the periodicity of a Dutch auction, which is described in more detail below.

The market value of the eligible assets 20 may provide security for an obligation of the first entity 12 to pay the principal and accrued coupon rate of the debt instruments issued by the first entity 12. For debt service coverage purposes, because the debt instruments are backed by the market value of the eligible assets 20, the debt service coverage of the eligible assets 20 must be maintained at or above a "base margin requirement," which may correspond to the sum of the outstanding principle and the accrued interest amount for each debt instrument. The debt service coverage of the eligible assets 20 corresponds to the market value of the eligible assets 20 times a debt service coverage factor. The debt service coverage factor (i.e., a fraction greater than 0.0 and less than 1.0) may be assigned by a rating agency to achieve a desired rating for the debt instruments.

As mentioned above, the eligible assets 20 may comprise one or more relatively illiquid assets for which, traditionally, there has not been a significant market from which to adequately determine the market value of the assets. Therefore, according to various embodiments, in order to determine the market value of the eligible assets 20, a particular pro rata portion (or slice) of the beneficial interest in the eligible assets 20 may be periodically auctioned to one or more bidders 16 in a Dutch action format. For example, a fraction of the equity certificates may be periodically (e.g., monthly, quarterly, etc.) auctioned to the bidders 16 through a valuation agent (not shown) in a Dutch auction. The first entity 12 may hold the remaining portion of the equity certificates, which is used to back the debt instruments 12.

In anticipation of the Dutch auction, information regarding the eligible assets 20 may be available to interested auction participants. The information may be provided in one or a variety of forms, including hard or electronic documentation.

In the Dutch auction, a number of equity certificates representing the particular pro rata portion (or slice) of the beneficial interest in the eligible assets 20 are auctioned to the bidders 16. One or more bidders 16 may submit bids to a trading desk associated with the valuation agent, for example. The bids may be submitted by any appropriate communication channel, including, for example, telephone, facsimile, or computer data network, such as email, FTP or web-based communications. The Dutch auction may occur at a predisclosed time every period. The expiration time for bidders 16 to submit qualified bids for the auction may be a certain time prior to the auction, such as one hour before. Following compilation of the bids and a determination of the allocation to the winning bidders 16, the results from the auction may be posted, such as in an email or on a web site. Settlement may be conducted through a clearinghouse entity, such as the Depository Trust Company (DTC), for example.

In the Dutch auction, the winning bid (or "clearing price") is the highest bid price at which all of the auctioned equity certificates are sold. In a simplified example, if five equity certificates were to be auctioned (in practice, a much greater number of equity certificates may be auctioned), and the bids from the bidders 16 are as shown below in Table 1, the clearing price would be $17 because $17 is the highest price at which all of the equity certificates are sold (or bid for). According to various embodiments, all winning bidders pay the clearing price for their allocation.

TABLE 1

| Auction Participant | Bid Price | Quantity Sought |
|---|---|---|
| 1 | $20 | 1 |
| 2 | $19 | 2 |
| 3 | $18 | 1 |
| 4 | $17 | 1 |
| 5 | $16 | 3 |
| 6 | $15 | 1 |
| 7 | $14 | 2 |

Therefore, in this simplified example, the market value of the particular pro rata portion of the beneficial interest, the portion of the beneficial interest still owned by the first entity 12 following the Dutch auction, and the market value of the eligible assets 20, may be determined based on a selling price of $17 for the auctioned slice of the beneficial interest.

If the number of equity certificates requested by the winning bids in the final allocation exceeds the number of equity certificates available in the auction (a condition referred to as "oversubscription"), the available equity certificates may be allocated to the winning bidders on a pro rata basis or according to some other allocation technique. Also, in various embodiments, the auction may place caps and/or floors on the quantity and/or price of the bids. Also, non-qualified bids, i.e., bids with a specified quantity but no price, may be permitted.

The value of the pro rata portion of the eligible assets 20 auctioned off may be sized accordingly such that there is sufficient demand for the auctioned equity certificates among the potential bidders 16 and such that the resulting clearing price in the auction is a meaningful benchmark for the market value of the eligible assets 20 in the judgment of the rating agencies. In various embodiments, depending on the assets transferred by the first entity 12 to the second entity 14, one to five percent of the eligible assets 20 may be used as the pro rata portion to be auctioned off, with the first entity 12 retaining ownership of the remaining portion.

The clearing price from the Dutch action may be used to determine the market value of the beneficial interest owned by the first entity 12 following the initial Dutch auction. For example, the market value of the beneficial interest owned by the first entity 12 following the initial Dutch auction may be determined from the following equation:

$$MV = N \times P$$

where MV is the market value, N is the number of equity certificates still held by the first entity 12 following the initial Dutch auction, and P is the clearing price for the Dutch auction.

The clearing price from the Dutch action may also used to determine the market value of the eligible assets following any of the Dutch auctions. For example, the market value of the eligible assets following any of the Dutch auctions may be determined from the following equation:

$$MV = T \times P$$

where MV is the market value, T is the total number of equity certificates, and P is the clearing price for the Dutch auction.

The market value of the eligible assets 20 may be used to determine the required debt service coverage for the debt instruments. For example, for a given debt service coverage factor, the debt service coverage may be determined by the following equation:

$$DSC = MV \times DSCF$$

where DSC is the debt service coverage, MV is the market value, and DSCF is the debt service coverage factor.

Due to the nature of the eligible assets 20, the assets may change over time. For example, some assets may amortize, there may be a managed period in which there are new originations added to the eligible assets 20, the assets may include revolving facilities in which case there may be draws paid out, etc. In order to account for the potentially dynamic, relatively illiquid eligible assets 20, the Dutch auction may be repeated periodically (e.g., monthly, quarterly, etc.) during the term of the debt instruments. For each subsequent auction after the initial auction, the existing holders of the equity certificates may put their holdings up for auction. In that way, a continual (periodic) assessment of the market value of the eligible assets 20 may be obtained on an on-going basis for the term of the debt instruments.

In the subsequent auctions (i.e., the auction after the initial auction), after the bids have been solicited, compiled, analyzed, and the clearing price determined, existing holders of the equity certificates may choose whether to transact at the clearing price. That is, the existing holders of the equity certificates may choose to hold the entirety of their holdings, sell a portion of their holdings at the clearing price and hold the remaining portion, or sell the entirety of their holdings at the clearing price. A decision to hold onto a certain number of equity certificates by an existing holder, therefore, is effectively a bid by the existing holder to pay the clearing price for those equity certificates. Also, the existing holders could submit a bid for additional equity certificates.

In various embodiments, a certain threshold value of equity certificates (e.g., $X million) may be sold to various bidders 16 at the clearing price in each Dutch auction (which may include additional interests purchased by existing holders). If, due to the clearing price, the existing holders of the equity certificates decide to retain enough of their equity certificates such that this threshold supply would not be met, additional pro rata portions (or slices) of the beneficial interest owned by the first entity 12 may be sold to satisfy the threshold supply value. Proceeds from the sale of this additional incremental amount of the beneficial interest owned by the first entity 12 may be used to retire a corresponding amount of the debt instruments since it would no longer be available to back the debt.

In various embodiments, under certain trigger events, such as, for example, bankruptcy of the first entity 12, the cash flow from the eligible assets 20 may be used to pay down the debt instruments. Also, the trustee of the eligible assets 20 (which may be the first entity 12 or an entity related to and/or controlled by the first entity 12) may have the right to liquidate the eligible assets 20 to pay off the debt.

Figure 2:
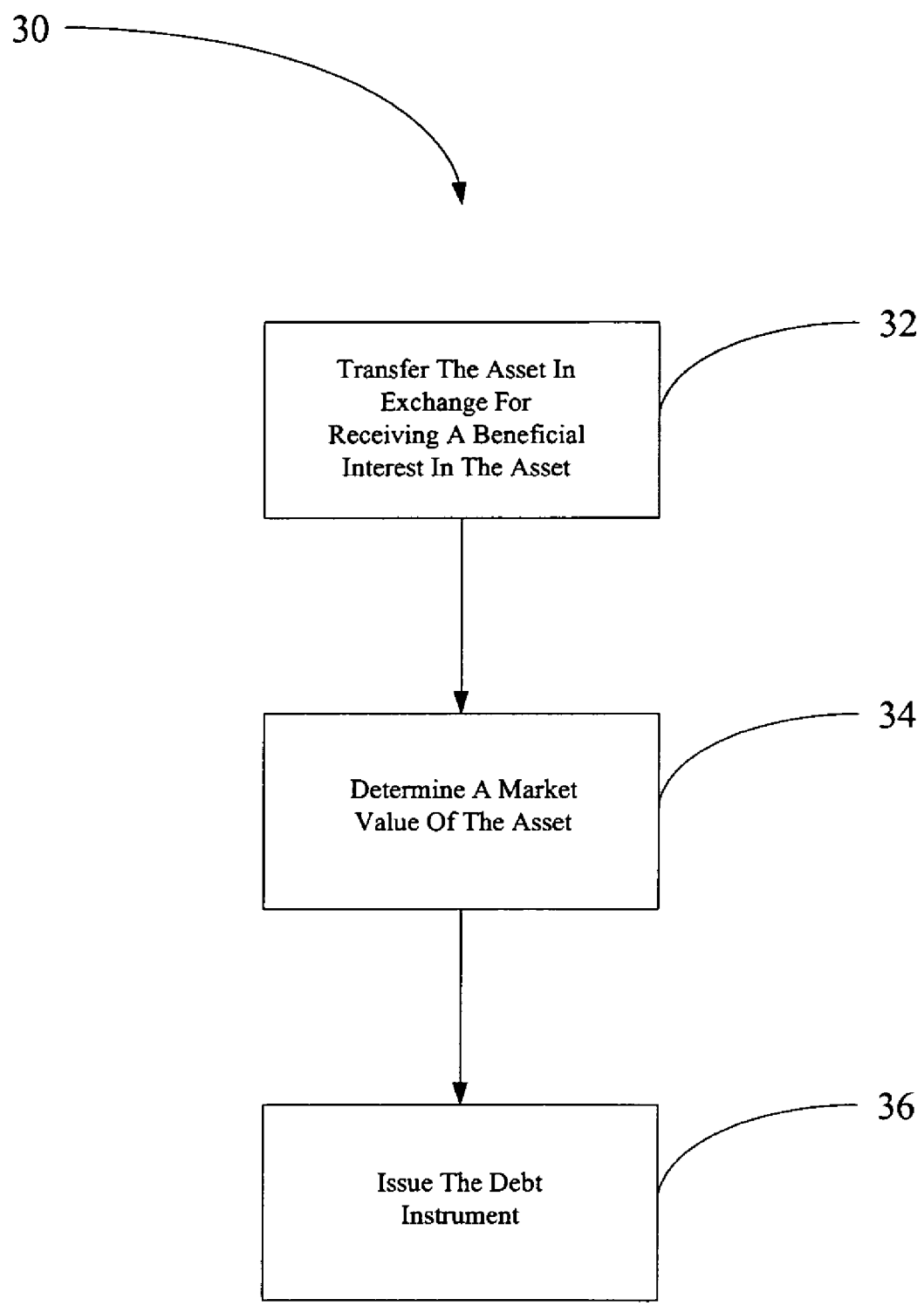
FIG. 2 illustrates various embodiments of a method for issuing a debt instrument.

FIG. 2 illustrates various embodiments of a method 30 for issuing a debt instrument backed by a market value of an asset. The method 30 utilizes the transaction structure 10 described above. The asset may comprise one or more relatively illiquid assets. The method begins at block 32, where the asset is transferred from the first entity 12 to the second entity 14 in exchange for the first entity 12 receiving a beneficial interest in the asset from the second entity 14. From block 32, the method advances to block 34, where the market value of the asset is determined. The market value of the asset may be determined based on the clearing price of the Dutch auction as described above. As previously described, the clearing price generally represents the value of a particular pro rata share of the asset. Therefore, one skilled in the art will appreciate that the method 30 may further comprise determining the value of the beneficial interest still held by first entity 12 following the Dutch auction, the debt service coverage, and the base margin requirement. From block 34, the method 30 advances to block 36, where a debt instrument backed by the market value of the asset is issued.

Figure 3:
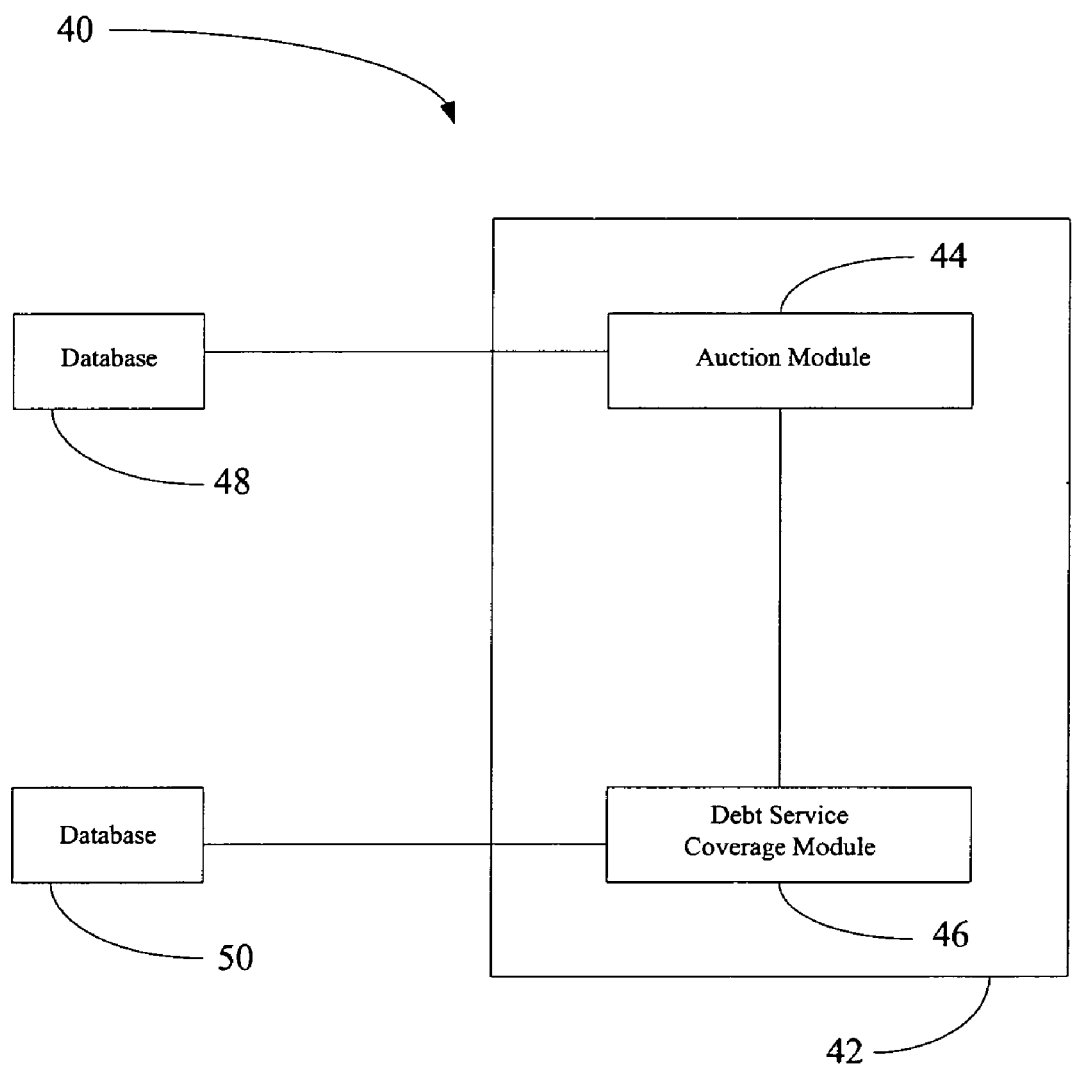
FIG. 3 illustrates various embodiments of a system for issuing a debt instrument.

FIG. 3 is a diagram of a system 40 system for issuing a debt instrument. The system 40 may be utilized to implement the method 30. The system 40 may comprise one or more networked computers 42, such as PCs, servers, mainframe computers, etc. The computer 42 may include an auction module 44, and a debt service coverage module 46 in communication with the auction module 44. The system 40 may also comprise a database 48 in communication with the auction module 44, and a database 50 in communication with the debt service coverage module 46. The database 48 may store bid data from the Dutch auction described above. The bid data may comprise, for example, bid information received from the bidders 16 by the valuation agent. The database 50 may store data regarding the issued debt instruments.

The auction module 44 is for determining a clearing price of a Dutch auction. The auction module 44 may determine the clearing price for the auction and the allocation to winning bidders 16 (i.e., bidders 16 who submit bids at or above the clearing price) based on the bid data stored in the database 48.

The debt service coverage module 46 is for determining a market value of an asset based on the clearing price of the Dutch auction. The debt service coverage module 46 may also be for determining a debt service coverage for the asset, and for determining a base margin requirement for the debt instrument. The debt service coverage module 46 may determine the base margin requirement based on the data stored at database 52 (regarding the issued debt instruments). Additionally, the debt service coverage module 46 may determine how much debt must be retired when, for example, additional increments of the first entity's 10 beneficial interest in the eligible assets 20 are sold, if ever, to satisfy the threshold supply level for one of the Dutch auctions.

Each of the modules 44, 46 may be implemented as software applications, computer programs, etc. utilizing any suitable computer language (e.g., C, C++, Delphi, Java, JavaScript, Perl, Visual Basic, VBScript, etc.) and may be embodied permanently or temporarily in any type of machine, component, physical or virtual equipment, storage medium, or propagated signal capable of delivering instructions to a device. The software code may be stored as a series of instructions or commands on a computer-readable medium such that when the medium is read by a processor (not shown) of the computer 42, the functions described herein are performed.

As used herein, the term "computer-readable medium" may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary. A computer-readable medium may further include one or more propagated signals, and such propagated signals may or may not be transmitted on one or more carrier waves.

Although the modules 44, 46 and the databases 48, 50 are shown in FIG. 3 as two separate modules and two separate databases, one skilled in the art will appreciate that the functionality of the modules 44, 46 may be combined into a single module and the functionality of the databases 48, 50 may be combined into a single database. Also, although the modules 44, 46 and the databases 48, 50 are shown as being part of a common system 40, the modules 44, 46 and the databases 48, 50 may be associated with separate, distinct systems that are in wired or wireless communication with one another. For example, for embodiments where one or more of the modules 44, 46 are installed on separate distinct systems, the modules may be in communication with one another via a network (not shown). Such a network may include any type of delivery system including, but not limited to, a local area network (e.g., Ethernet), a wide area network (e.g. the Internet and/or World Wide Web), a telephone network (e.g., analog, digital, wired, wireless, PSTN, ISDN, GSM, GPRS, and/or xDSL), a packet-switched network, a radio network, a television network, a cable network, a satellite network, and/or any other wired or wireless communications network configured to carry data. Such a network may also include elements, such as, for example, intermediate nodes, proxy servers, routers, switches, and adapters configured to direct and/or deliver data.

While several embodiments of the invention have been described, it should be apparent, however, that various modifications, alterations and adaptations to those embodiments may occur to persons skilled in the art with the attainment of some or all of the advantages of the invention. For example, it will be appreciated that the asset described above may comprise one or more assets, the bidder 16 may comprise one or more bidders 16, the debt instrument may comprise one or more debt instruments, the third-party investor 18 may comprise one or more third-party investors 20, etc. This application is therefore intended to cover all such modifications, alterations and adaptations without departing from the scope and spirit of the disclosed invention as defined by the appended claims.

What is claimed is:

1. A computer-implemented method for supporting issuance of debt financial instruments backed by illiquid assets, comprising:

transferring the illiquid assets, by a first entity that initially owned the illiquid assets to a second entity in exchange for the first entity receiving one or more equity certificates from the second entity, wherein the illiquid assets comprise one of equipment leases and loans on transportation vehicles, and wherein the one or more equity certificates comprise a beneficial ownership interest in the illiquid assets and cash flows generated by the illiquid assets;

auctioning a first portion of the one or more equity certificates in an initial auction, wherein the auctioning comprises receiving, via one or more communication networks, bids from one or more bidders storing bid data for the bids in a database;

determining, with a computer system, a clearing price for the first portion of the one or more equity certificates based on the bid data stored in the database;

determining, with the computer system, a market value of a second portion of the one or more equity certificates owned by the first entity that back debt financial instruments to be issued by the first entity to investors, wherein the market value of the second portion is calculated based on the clearing price;

determining, with the computer system, a debt service coverage amount based on the product of the market value of the second portion of the one or more equity certificates and a debt service coverage factor;

determining, with the computer system, a base margin requirement; and issuing the debt financial instruments by the first entity to investors, wherein the debt service coverage amount and the base margin requirement are applicable to the debt financial instruments and there is an obligation to maintain the debt service coverage amount in excess of the base margin requirement, wherein the second portion of the one or more equity certificates secures an obligation of the first entity to pay principle and interest on the debt financial instruments;

auctioning, after the initial auction and during the term of the debt instruments, an additional portion of the one or more equity certificates, and determining, using the computer system, a new clearing price, and redetermining, using the computer system, the market value of the second portion;

wherein the base margin requirement corresponds to the sum of outstanding principal and accrued interest associated with the debt financial instruments; and wherein the computer system comprises at least one computer that comprises a processor and a memory.

2. The method of claim 1, further comprising:

conducting subsequent auctions of equity certificates on a periodic basis, wherein existing investors may choose whether to transact at a determined clearing price or to hold their equity certificates; and redetermining the market value of the illiquid assets.

3. A computer-implemented system for supporting issuance of debt financial instruments backed by illiquid assets, wherein the illiquid assets are transferred by a first entity that initially owned the illiquid assets to a second entity in exchange for the first entity receiving one or more equity certificates, wherein the illiquid assets comprise one of equipment leases and loans on transportation vehicles, and, wherein the one or more equity certificates comprise a beneficial ownership interest in the illiquid assets and cash flows generated by the illiquid assets, the system comprising:

a database that stores bid data from periodic auctions of an auction portion of the one or more equity certificates to one or more bidders; and a computer system in communication with the database, wherein the computer system comprises at least one processor and computer-readable medium that stores instructions to be executed by the processor, wherein the computer-readable medium comprises instructions that, when executed by the at least one processor cause the at least one processor to execute:

an auction module that periodically determines bidder allocations of the auction portion of the one or more equity certificates and a clearing price for the auction portion of the one or more equity certificates; and a debt service coverage module, wherein the debt service coverage module periodically determines a market value of a backing portion of the one or more equity certificates owned by the first entity that back debt issued by the first entity to investors, and the market value of the backing portion is calculated based on the clearing price, and wherein the debt service coverage module periodically determines a debt service coverage amount based on the product of the market value of the backing portion of the one or more equity certificates and a debt service coverage factor, and wherein the debt service coverage module periodically determines a base margin requirement corresponding to the sum of outstanding principle and accrued interest associated with the debt financial instruments;

wherein the debt service coverage amount and the base margin requirement are applicable to debt financial instruments issued by the first entity to investors and there is an obligation to maintain the debt service coverage amount in excess of the base margin requirement, and wherein the backing portion of the one or more equity certificates secures an obligation to pay the principal and interest on the debt financial instruments.

4. The system of claim 3, wherein for each of the periodic auctions, the investors may choose whether to transact at a determined clearing price or to hold their equity certificates; and wherein the debt service coverage module redetermines the market value of the illiquid assets on the periodic basis.

\* \* \* \* \*